US008879396B2

(12) United States Patent
Guay et al.

(10) Patent No.: US 8,879,396 B2
(45) Date of Patent: Nov. 4, 2014

(54) SYSTEM AND METHOD FOR USING DYNAMIC ALLOCATION OF VIRTUAL LANES TO ALLEVIATE CONGESTION IN A FAT-TREE TOPOLOGY

(71) Applicant: Oracle International Corporation, Redwood Shores, CA (US)

(72) Inventors: Wei Lin Guay, Penang (MY); Bjørn Dag Johnsen, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 13/648,961

(22) Filed: Oct. 10, 2012

(65) Prior Publication Data
US 2013/0121154 A1 May 16, 2013

Related U.S. Application Data

(60) Provisional application No. 61/560,226, filed on Nov. 15, 2011.

(51) Int. Cl.
| | |
|---|---|
| *H04J 1/16* | (2006.01) |
| *H04L 12/24* | (2006.01) |
| *H04L 12/729* | (2013.01) |
| *H04L 12/753* | (2013.01) |
| *H04L 12/933* | (2013.01) |
| *H04L 12/707* | (2013.01) |
| *H04L 12/26* | (2006.01) |
| *H04L 12/801* | (2013.01) |

(52) U.S. Cl.
CPC .............. *H04L 45/48* (2013.01); *H04L 43/065* (2013.01); *H04L 41/0816* (2013.01); *H04L 45/125* (2013.01); *H04L 49/15* (2013.01); *H04L 45/22* (2013.01); *H04L 47/12* (2013.01)
USPC .......................................... 370/236; 370/252

(58) Field of Classification Search
CPC ......... H04L 47/10; H04L 47/30; H04L 47/11; H04L 47/12; H04L 47/15; H04L 47/2441; H04L 47/70; H04L 47/35; H04L 47/32; H04L 47/27; H04L 41/12; H04L 2012/44; H04L 45/48; H04L 41/04; H04L 45/04; H04L 45/02; H04L 45/00; H04L 12/44; H04L 5/14; H04L 12/50
USPC ......... 370/229, 230, 235, 236, 278, 400, 231, 370/254, 408, 357, 252; 709/221, 220, 224, 709/223, 203, 222; 714/4.1, E11.134
See application file for complete search history.

(56) References Cited

U.S. PATENT DOCUMENTS 7,016,996 B1 * 3/2006 Schober ........................ 710/113
7,136,907 B1 * 11/2006 Nordstrom et al. ........... 709/220
(Continued)

OTHER PUBLICATIONS

Guay, W. et al., "dFtree—A Fat-Tree Routing Algorithm Using Dynamic Allocation of Virtual Lanes to Alleviate Congestion in InfiniBand Networks," NDM '11 Proceedings of the First International Workshop on Network-Aware Data Management, Nov. 14, 2011, Seattle, Washington, USA, pp. 1-10.
Guay, W. et al., Host Side Dynamic Reconfiguration with InfiniBand, 2010 IEEE International Conference on Cluster Computing, IEEE, Piscataway, NJ, USA, Sep. 20, 2010, pp. 126-135.

(Continued)

*Primary Examiner* — Abdullah Riyami
(74) *Attorney, Agent, or Firm* — Meyer IP Law Group

(57) ABSTRACT

A system and method can prevent traffic congestion in a middleware machine environment with a plurality of switches in a fat-tree topology. A subnet manager can sweep a subnet in the middleware machine environment to discover changes and maintain the subnet fully connected. A performance manager can retrieve performance and error-related information from one or more performance management agents that are associated with one or more components in the subnet. Then, a host can dynamically reconfigure one or more virtual lanes in order to improve network performances.

20 Claims, 4 Drawing Sheets

(56) References Cited

U.S. PATENT DOCUMENTS

| | | | | |
|---|---|---|---|---|
| 7,636,772 | B1* | 12/2009 | Kirby et al. | 709/221 |
| 7,644,182 | B2* | 1/2010 | Banerjee et al. | 709/242 |
| 2003/0005039 | A1* | 1/2003 | Craddock et al. | 709/203 |
| 2003/0156588 | A1* | 8/2003 | Elbourne et al. | 370/395.41 |
| 2009/0187756 | A1* | 7/2009 | Nollet et al. | 713/100 |
| 2009/0307642 | A1* | 12/2009 | Lai et al. | 716/5 |
| 2010/0077312 | A1* | 3/2010 | Morss | 715/740 |
| 2011/0044435 | A1* | 2/2011 | Bachran et al. | 379/88.17 |
| 2012/0072563 | A1* | 3/2012 | Johnsen et al. | 709/223 |
| 2012/0311333 | A1* | 12/2012 | Johnsen et al. | 713/168 |

OTHER PUBLICATIONS

Guay, W. et al., "vFtree—A Fat-Tree Routing Algorithm Using Virtual Lanes to Alleviate Congestion," 2011 IEEE International Parallel & Distributed Processing Symposium, May 16, 2011, pp. 197-208.

Vishnu, A. et al., "Topology Agnostic Hot-Spot Avoidance With InfiniBand," Concurrency and Computation: Practice and Experience, Mar. 10, 2009, pp. 301-319, vol. 21, No. 3, published online Sep. 1, 2008 in Wiley InterScience (www.interscience.wiley.com).

European Patent Office, International Searching Authority, International Search Report and Written Opinion dated Mar. 27, 2013 for International Patent Application No. PCT/US2012/065115, 12 pages.

* cited by examiner

SYSTEM AND METHOD FOR USING DYNAMIC ALLOCATION OF VIRTUAL LANES TO ALLEVIATE CONGESTION IN A FAT-TREE TOPOLOGY

CLAIM OF PRIORITY

This application claims the benefit of priority on U.S. Provisional Patent Application No. 61/560,226, entitled "SYSTEM AND METHOD FOR USING DYNAMIC ALLOCATION OF VIRTUAL LANES TO ALLEVIATE CONGESTION IN A FAT-TREE TOPOLOGY" filed Nov. 15, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application Ser. No. 13/671,467, filed Nov. 7, 2012 entitled "SYSTEM AND METHOD FOR USING VIRTUAL LANES TO ALLEVIATE CONGESTION IN A FAT-TREE TOPOLOGY," by inventors Wei Lin Guay and Bartosz Bogdanski.

FIELD OF INVENTION

The present invention is generally related to computer systems, and is particularly related to preventing head-of-line blocking and traffic congestion in a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can prevent head-of-line blocking and traffic congestion in a middleware machine environment with a plurality of switches in a fat-tree topology. A subnet manager can sweep a subnet in the middleware machine environment to discover changes and maintain the subnet fully connected. A performance manager can retrieve performance and error-related information from one or more performance management agents that are associated with one or more components in the subnet. Then, a host can dynamically reconfigure one or more virtual lanes in order to improve network performances.

DETAILED DESCRIPTION

Figure 1:
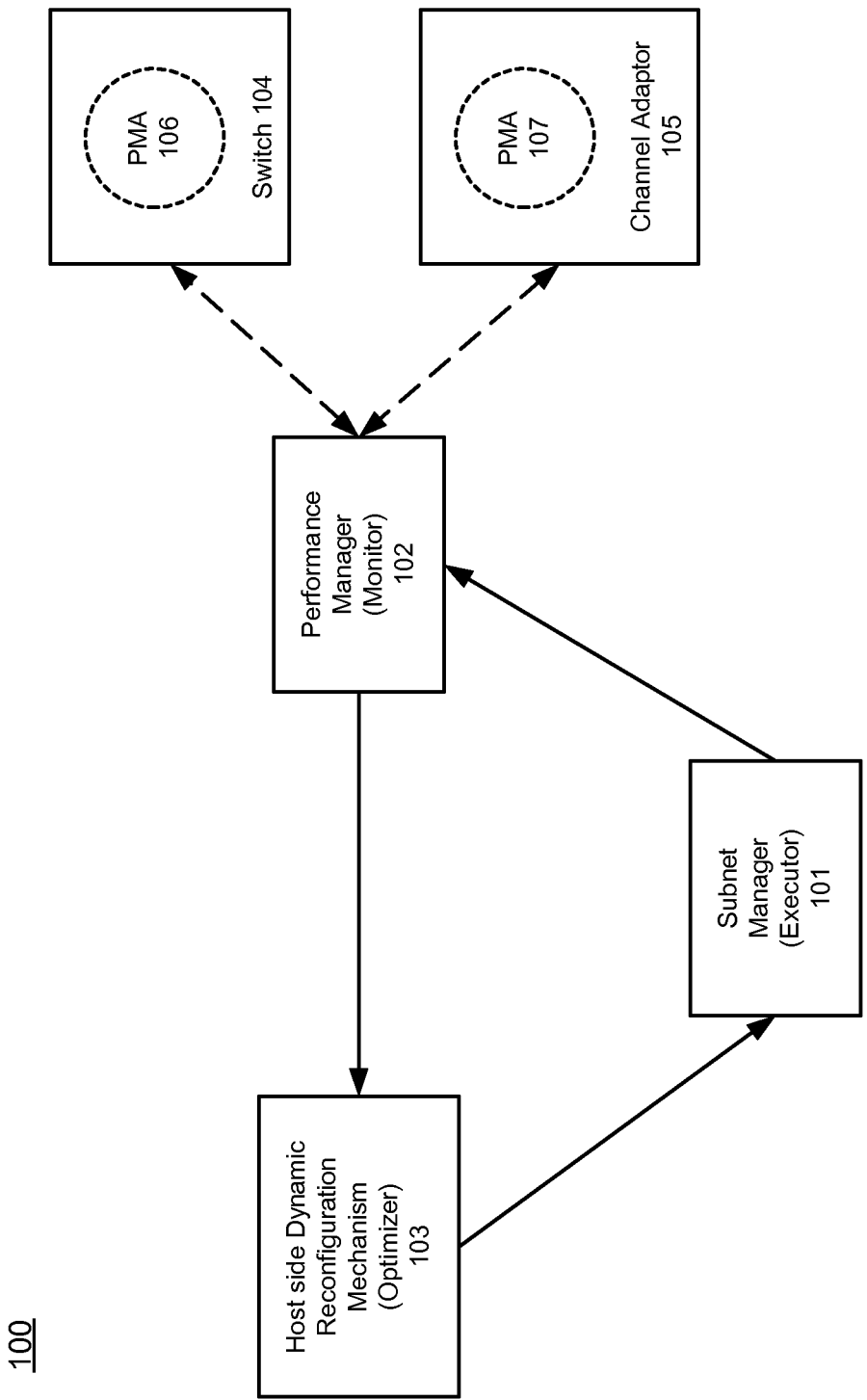
FIG. 1 shows an illustration of optimization feedback cycle in a middleware environment in accordance with an embodiment of the invention.

Algorithmic predictability of network traffic patterns is reduced with the introduction of virtualization and many-cores systems. When multiple virtualized clients reside on the same physical hardware, the network traffic becomes an overlay of multiple traffic patterns that might lead to hot-spots in the network. A hot-spot occurs if multiple flows are directed toward a single endpoint. Common sources for hot-spots include complex traffic patterns due to virtualization, migration of virtual machine images, checkpoint and restore mechanisms for fault tolerance, and storage and I/O traffic.

When a hot-spot exists in a network, the flows designated for the hot-spot might reduce the performance for other flows, called victim flows, not designated to the hot-spot. This is due to the head-of-line (HOL) blocking phenomena created by the congested hot-spot.

One way to avoid this problem is to use a congestion control (CC) mechanism such as the CC mechanism evaluated in hardware. However, the congestion control mechanism evaluated in hardware may not always be available, e.g. due to a mixture of old and new equipments coexisting in large clusters. Furthermore, the selection of the appropriate CC parameters highly depends on the topology and incorrect parameters might lead to performance degradation. Additionally, some oscillations can occur among the flows due to the fact that the congestion control mechanism is dynamically adjusting the injection rate of the senders.

In accordance with an embodiment of the invention, a system and method can prevent head-of-line blocking and traffic congestion in an interconnected network, such as a middleware machine environment with a plurality of switches using a fat-tree topology. A subnet manager can sweep a subnet in the middleware machine environment to discover changes and maintain the subnet fully connected. A performance manager can retrieve performance and error-related information from one or more performance management agents that are associated with one or more components in the subnet. Then, a host can dynamically reconfigure one or more virtual lanes in order to improve network performances.

InfiniBand (IB) Architecture

In accordance with an embodiment of the invention, traffic congestion can be prevented in the InfiniBand (IB) architecture, which is a serial point-to-point technology. Each of the IB networks, or subnets, can include a set of hosts interconnected using switches and point-to-point links. A single subnet is scalable to more than ten-thousand nodes and two or more subnets can be interconnected using an IB router. The hosts and switches within a subnet are addressed using local identifiers (LIDs), e.g. a single subnet is limited to 48151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using Queue Pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a Send Queue (SQ) and a Receive Queue (RQ). There is one such pair present at each end-node that is participating in the communication. The send queue holds work requests to be transferred to the remote node, while the receive queue holds information on what to do with the data received from the remote node. In addition to the QPs, each HCA can have one or more Completion Queues (CQs) that are associated with a set of send and receive queues. The CQ holds completion notifications for the work requests posted to the send and receive queue.

The Subnet Administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), MTU, etc. to establish a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The SM is also responsible for monitoring the network for changes using Subnet Management Agents (SMAs) that are presented in every switch and/or every HCA. The SMAs communicate changes, such as new connections, disconnections, and port state change, to the SM using traps and notices.

A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

An Optimization Feedback Cycle for Performance Management

FIG. 1 shows an illustration of optimization feedback cycle in a middleware environment in accordance with an embodiment of the invention. As shown in FIG. 1, an optimization feedback cycle in the middleware environment includes an executor (e.g. a subnet manager 101), a monitor (e.g. a performance manager 102), and an optimizer (e.g. a switch 104).

The subnet manager 101 can periodically sweep a subnet to discover changes and to maintain a fully connected subnet. Furthermore, the performance manager 102 can periodically collect information from every component in the subnet in order to analyze the network performance, and the host side stack 103 can dynamically reconfigure the addressing state information for network configurations.

Additionally, each device in the subnet, such as a switch 104 or a channel adapter 105, can implement a performance management agent (PMA) 106 or 107. Each PMA can be associated with a set of performance monitoring and error monitoring registers. The performance manager 102 can retrieve performance and error-related information from these registers, for example using a performance management datagram (MAD).

Performance management is one of the general management services provided by IB to retrieve performance statistics and error information from IB components. Each IB device can implement a PMA and a minimum set of performance monitoring and error monitoring registers. In addition, the IB specification also defines a set of optional attributes permitting the monitoring of additional performance and error counters.

The performance manager (PM) can retrieve performance and error-related information from these registers, by issuing a performance MAD to the PMA of a given device. The PM then executes the retrieval and returns the result to the PMAs. The PM can use this information to detect incipient failures and based on this information, the PM can advise the SM about recommended or required path changes and performance optimizations.

Performance management is related to performance tuning, including finding and eliminating bottlenecks. The optimization feedback cycle as shown in FIG. 1 can be applied to support using dynamic allocation of virtual lanes to alleviate network congestion with the help of the SM, the PM, and host stack with the host side dynamic reconfiguration capability. In a subnet, the SM periodically sweeps the subnet to discover changes and maintain a fully connected subnet. The PM can periodically collect information from every component in the subnet in order to analyze the network performance. After the analysis, the PM forwards the relevant information to host stack that reconfigures the virtual lanes in order to improve network performance.

In accordance with an embodiment of the invention, a routing algorithm can utilizes multiple virtual lanes (VLs) to improve performance during the existence of hot-spots. The VLs can be assigned statically during the routing table generation and can avoid the negative impact of the congestion, with the assumption that the topology is a balanced, fully populated and fault-free fat-tree. Additionally, a mechanism using dynamic allocation of virtual lanes to alleviate network congestion can be designed to identify the hot-spot flows and assign the virtual lanes dynamically.

Compared to IB congestion control, using dynamic allocation of virtual lanes to alleviate network congestion, the need for source throttling of the contributors is removed. Furthermore, the IB CC parameters can cause oscillations among all the flows, because IB CC can dynamically adjust the injection rate of the senders. As a result, the IB CC solution might not be suitable for congestion problem of a more persistent nature because the oscillations can reduce the overall network throughput. Such persistent congestion problems occur when traffic has been moved away from a failed link, when multiple jobs run on the same system and compete for network resources, or when a system is not balanced for the application that runs on it. The persistent congestion problems can be handled by first detecting them, and thereafter dynamically redistributing the VL resources so as to obtain a balance that may be impossible to achieve statically at system start-up.

In accordance with an embodiment of the invention, a SM can be used along with the PM enabled. The added overhead due to that the PM periodically queries the performance counters in each component within the subset can have minimal impact on data traffic, as long as the SM is running on a dedicated node.

Figure 2:
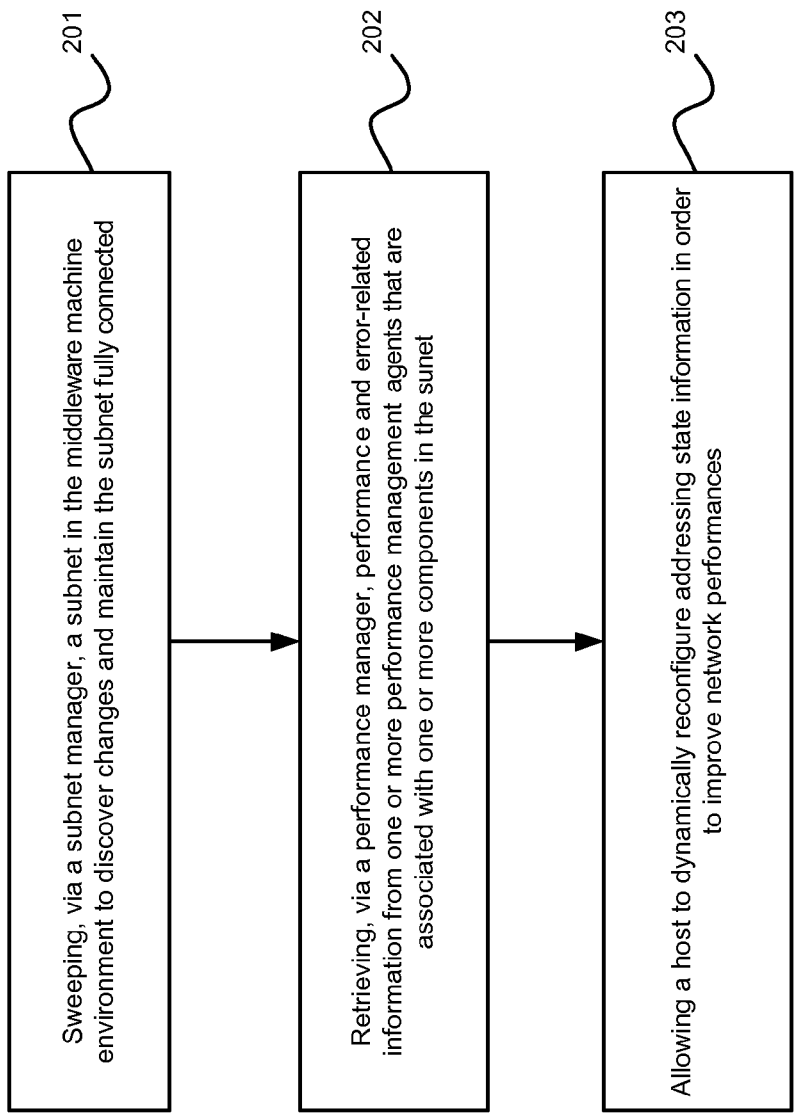
FIG. 2 illustrates an exemplary flow chart for alleviating network congestion in a middleware environment in accordance with an embodiment of the invention.

FIG. 2 illustrates an exemplary flow chart for alleviating network congestion in a middleware environment in accordance with an embodiment of the invention. As shown in FIG. 2, at step 201, a subnet manager sweeps a subnet in the middleware machine environment to discover changes and maintain the subnet fully connected. Then, at step 202, a performance manager can retrieve performance and error-related information from one or more performance management agents that are associated with one or more components in the sunet. Finally, at step 203, the system allows a host to dynamically reconfigure network connection, such as the addressing state information, in order to improve network performances.

Alleviate Congestion in a Fat-tree Topology

In accordance with an embodiment of the invention, the optimization feedback cycle mechanism can be applied to any topology and routing algorithm. In one example, fat-trees can be used because of the simplicity with respect to freedom from deadlock. The system can dynamically updates congested connections and move congested traffic flows to a different virtual lane in the fabric, and thereby ensure that the congestion effects do not have impact on connections that are not subject to the congestion.

Figure 3:
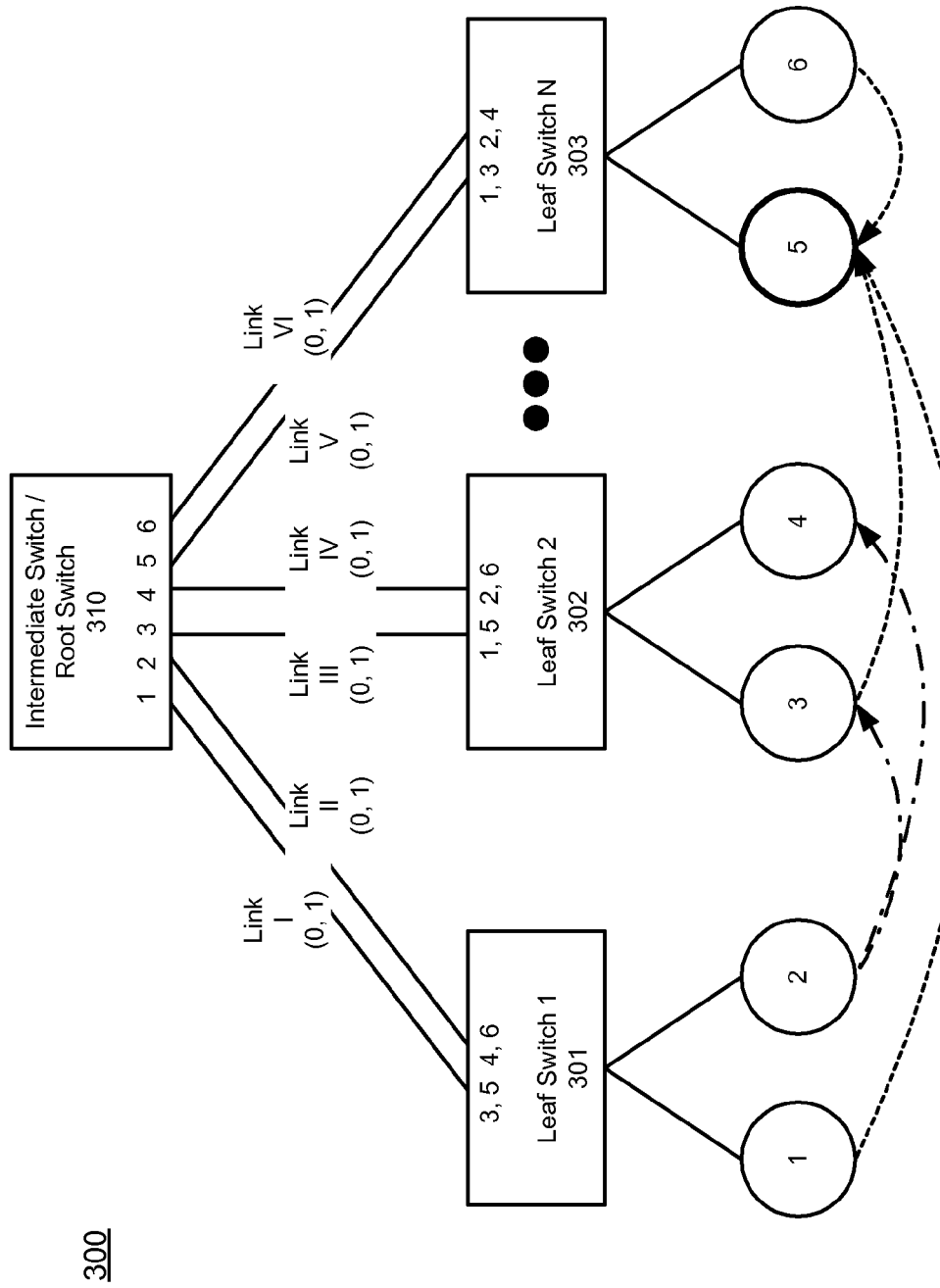
FIG. 3 shows an illustration of dynamic allocation of virtual lanes to alleviate congestion in a fat-tree topology in accordance with an embodiment of the invention.

FIG. 3 shows an illustration of dynamic allocation of virtual lanes to alleviate congestion in a fat-tree topology in accordance with an embodiment of the invention. As shown in FIG. 3, the middleware machine environment 400 includes a plurality of leaf switches, e.g. switches 301 to 303, and a plurality of nodes, such as server nodes 1-6 that connect to the leaf switches in a fat-tree topology. Additionally, the leaf switches 301-303 can connect to an intermediate switch or a root switch 310 using one or more physical links I-VI.

In accordance with an embodiment of the invention, each physical link can support one or more virtual lanes (VLs). The VLs are logical channels on the same physical link with separate buffering, flow control, and congestion management resources. As shown in FIG. 3, each physical link I-VI can have multiple virtual lanes, such as a slow lane (virtual lane 1) and a fast lane (virtual lane 0), and all packet flows can be configured to run on the fast lane initially.

A routing algorithm can ensure deadlock freedom in the fat tree topology. The routing algorithm can include two stages: an upward stage in which the packet is forwarded from the source, and a downward stage when the packet is forward toward the destination. The transition between these two stages occurs at the least common ancestor, which is the intermediate switch or a root switch 310 that can reach both the source and the destination through its downward ports.

When multiple virtualized clients reside on the same physical hardware, the network traffic becomes an overlay of multiple traffic patterns that might lead to hot-spots in the network. In the example as shown in FIG. 3, end node 5 can become a hot spot, when multiple flows (in dot lines) from the contributors such as node 1, node 3, and node 6 are destined toward it.

The flows designated for a hot spot can reduce the performance for other flows. In the above example, there can be another flow from node 2 to node 3. The upward stage of the flow from node 1 to node 5 and the flow from node 2 to node 3 shares the physical link I, since physical link I is designated to handle the traffic from the leaf switch 301 to both the leaf switches 302 and 303. Due to the head-of-line (HOL) blocking phenomena, the flow from node 2 to node 3 can become a victim flow (in dash line).

The system can distribute the two upward stages of the two flows over different virtual lanes on the same physical link, for example by separating network flows into slow lane and fast lane traffics. After discovering that node 5 is a hot-spot, the system can trigger the forwarding of a message, e.g. a re-path trap, to all potential contributors, such as nodes 1, 3, and 6. Then, the system can direct the flow from node 1 to node 5 to go through virtual lane 0 on physical link I, which is designated as the slow lane. Additionally, if a new flow is directed to the existing hot spot, node 5, the new flow can be moved to the slow lane. On the opposite, if the node 5 is no longer a hot spot, all flows directed to the node 5 can be moved back to virtual lane 1, which is classified as the fast lane on physical link I.

Figure 4:
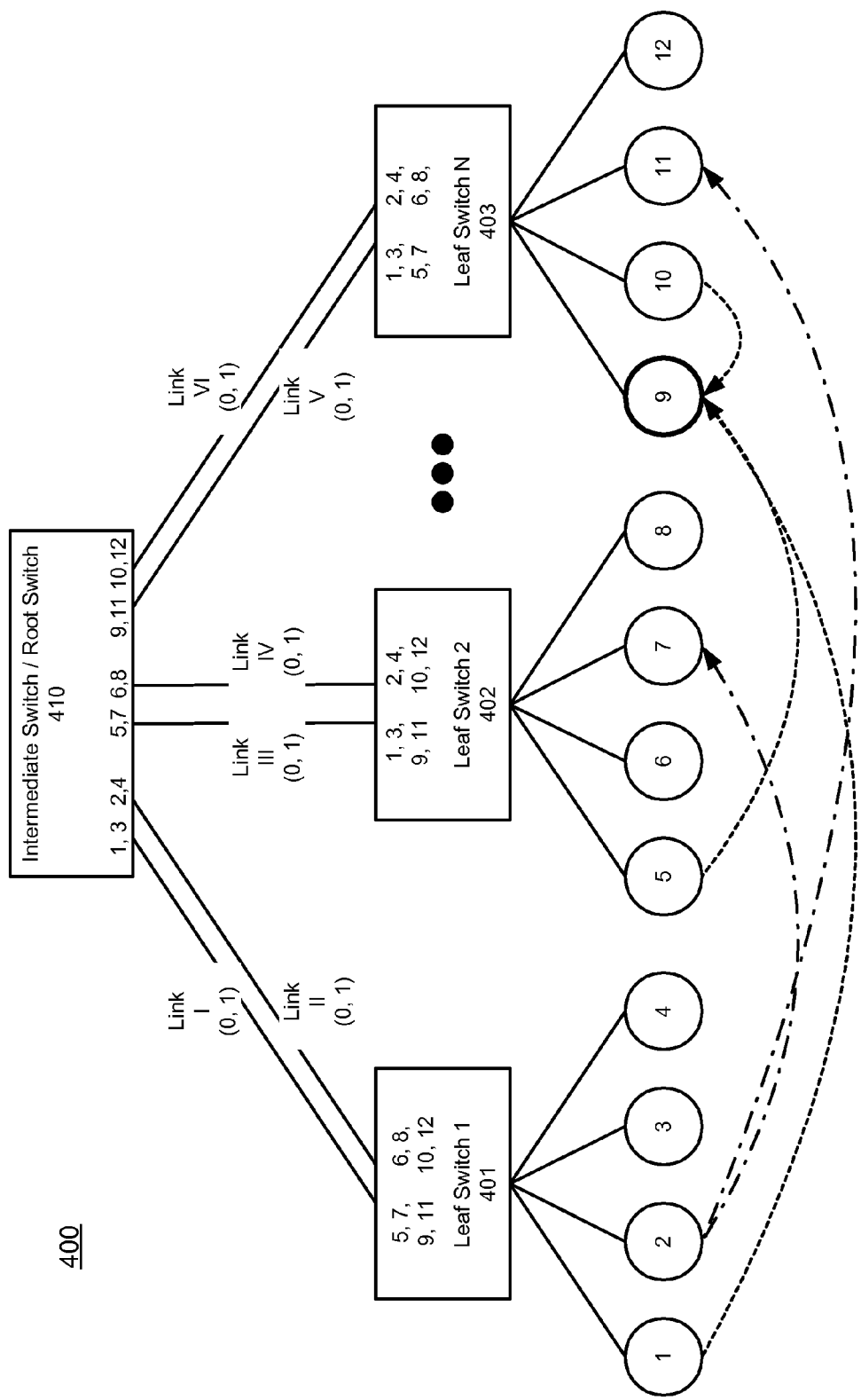
FIG. 4 shows an illustration of dynamic allocation of virtual lanes to alleviate congestion in an over-subscribed fat-tree topology in accordance with an embodiment of the invention.

FIG. 4 shows an illustration of dynamic allocation of virtual lanes to alleviate congestion in an over-subscribed fat-tree topology in accordance with an embodiment of the invention. As shown in FIG. 4, the middleware machine environment 400 includes a plurality of leaf switches, such as switches 401 to 403, and a plurality of nodes, such as server nodes 1-12 that connect to the leaf switches in a fat-tree topology. Additionally, the leaf switches 401-403 can connect to an intermediate switch or a root switch 410 using one or more physical links I-IV.

In this oversubscribed fat-tree, the downward path for forwarding a packet is shared by several destinations, instead of dedicating to a single destination as shown in FIG. 3. The oversubscribed fat-tree in FIG. 4 is a 2:1 oversubscribed fat-tree, since each downward path is shared by two destinations.

As shown in FIG. 4, the traffic flows from nodes 1, 5, and 10 to node 9 can cause the negative impact of HOL blocking in the oversubscribed fat-tree. Thus, the hot-spot is at node 9, and node 1, 5 and 10 are the contributors.

There can be two situations where the victim flows can suffer from HOL blocking when the links are oversubscribed, one at the upward stage and one at the downward stage.

As shown in FIG. 4, the victim flow from node 2 to node 7 shares an upward stage from leaf switch 401 to the intermediate/root switch 410 with the hot-spot flow from the contributor node 1 to node 9, through physical link I. This is similar to the example as shown in FIG. 3, where the performance reduction is due to the upstream link being shared with the congestion contributor, node 1.

Also as shown in FIG. 4, the victim flow from node 2 to node 11 shares the upward link from leaf switch 401 to the intermediate/root switch 410 with the hot-spot flow from the contributor node 1 to node 9, through physical link I. Additionally, the victim flow from node 2 to node 11 shares a downward stage from the intermediate/root switch 410 to the leaf switch 403 with all hot-spot contributors. In this case, the performance reduction happens at the downstream link being shared with the congestion contributor, node 1, even though the destination node of the victim flow, node 11, is a different node from the hotspot.

The system can distribute the flows over different virtual lanes on the same physical link, for example by separating network flows into slow lane and fast lane traffics.

dFtree Algorithm

In accordance with an embodiment of the invention, a routing algorithm, e.g. the dFtree algorithm, can be use to perform the allocation of VLs dynamically during network operation using the optimization feedback cycle. A performance manager monitors the network using hardware port counters to detect congestion and optimizes the current VL allocation by classifying flows as either slow lane (contributors to congestion) or fast lane (victims of congestion). Then, the optimization can be applied using a host side dynamic reconfiguration method. The effect of this method is that all flows contributing to congestion are migrated to a separate VL (slow lane) in order to avoid the negative impact of head-of-line blocking on the flows not contributing to congestion (victim flows).

The routing algorithm can use various metrics to identify the hot-spot flows dynamically, such as IB performance counters: XmitWait, and XmitData. The IB counter XmitWait is the number of ticks when a port selected has data to transmit but no data was actually sent during an entire tick, e.g. because of insufficient credits or because of lack of arbitration. Here, a tick is the IB architecture hardware sampling clock interval. Furthermore, the IB counter XmitData is the total number of data in double words transmitted on all VLs. Additionally, the routing algorithm can use other metrics such as Interval, which is the number of seconds between each performance sweep, to identify the hot-spot flows.

A congestion indicator value can be calculated for a remote switch port of an end node based on a formula, $\Delta xmitWait/Interval$. The congestion indicator value defines the normalized port congestion as the number of XmitWaits per second. If the congestion indicator value exceeds a threshold value, it indicates that the endnode is a hot-spot.

An oversubscribed end node with a high congestion indicator value is either a contributor to the congestion or a victim flow. For example, the contributors at end node 1, 5, 10 and the victim at end node 2 in FIG. 4 all can have a high congestion indicator value. On the other hand, an end node that has a high congestion indicator value for its remote switch port indicates that it is an end point hotspot. For example, the remote switch port that is connected to end node 9 in FIG. 4 can have a high congestion indicator value.

The sender port bandwidth can be measured for each port based on a formula, e.g. $\Delta xmitWait*4/Interval$. This formula is derived from the XmitData performance counter that represents the number of bytes transmitted between the performance sweeps. In the formula, the XmitData performance counter is multiplied by 4, because the XmitData counter is measured in a unit of 32-bit words.

The port utilization can be defined as the ratio between the actual bandwidth and the maximum supported link bandwidth.

In accordance with an embodiment of the invention, the dFtree implementation includes two algorithms: a first algorithm (e.g. Algorithm 1 as shown below) to identify the hot-spot flows and a second algorithm (e.g. Algorithm 2 as shown below) to reassign a hot-spot flow to a virtual lane classified as a slow lane.

---

Algorithm 1 Detect endpoint hot-spot and its contributors
Ensure: Subnet is up and running and PM is constantly sweeping

```
1:   for sw_src = 0 to sw_max do
2:     for port_sw = 0 to port_max do
3:       if remote_port(port_sw) == HCA then
4:         if congestion_port > Threshold then
5:           if port_sw ≠ hot-spot then
6:             Mark port_sw as hotspot_port
7:           end if
8:           Encapsulate hotspot_LID in a repath trap
9:           Encapsulate slow lane as SL_repath trap
10:          for hca_src = 0 to hca_max do
11:            if congestion_port > Threshold then
12:              if hca ≠ hotspot_LID contributor then
13:                if Utilisation_port < 0.5 then
14:                  Mark hca as hotspot_LID contributor
15:                  Forward repath trap to HCA
16:                end if
17:              end if
18:            end if
19:          end for
20:        else if congestion_port < Threshold then
21:          if port_sw == hot-spot then
22:            Clear port_sw as hotspot_port
23:            Encapsulate hotspot_LID in a unpath trap
24:            Encapsulate fast lane as SL_repath trap
25:            for hca_src = 0 to hca_max do
26:              if hca is hotspot_LID contributor then
27:                Clear hca as hotspot_LID
28:                Forward unpath trap to HCA
29:              end if
30:            end for
31:          end if
32:        end if
33:      end if
34:    end for
35:  end for
```

---

Algorithm 2 Reconfigure QP to slow/fast lane
Ensure: Host receives repath trap

```
1:   for QP_i = 0 to QP_max do
2:     if DLID_QP == DLID_repath trap then
3:       Reconfigure SL_QP according to SL_repath trap
4:     end if
5:   end for
```

---

Algorithm 1 can be executed after every iteration of the performance sweep. The algorithm checks if the remote switch port of an end node has a congestion indicator value exceeding the threshold. For example, the threshold value for congestion that is use to determine congestion can be set as 100000 XmtWait ticks per second. The XmtWait counter is calculated on a per port basis, so the threshold value to determine congestion is applicable even if the network size increases.

If the remote switch port of an end node has a congestion indicator value exceeding the threshold, then the conclusion is that the end node is a hot spot and the remote switch port is marked as a hot spot port. After discovering an endpoint hot-spot, the first algorithm triggers the forwarding of a repath trap to all potential contributors. This repath trap encapsulates the LID of the congested node.

The detection of the hot-spot flows depends on the interval of the performance sweeps. If a hot-spot appeared just after iteration n, the hot-spot detection and the 'slow lane' assignment can only be performed at iteration n+1, i.e. t seconds later.

The congestion indicator value and the port utilization ratio can be used to identify a potential contributor. The congestion indicator value exceeding the threshold indicates that an end node can be either a hot-spot contributor or a victim flow, whereas the port utilization ratio can be used to differentiate between a fair share link and a congested link.

For example, if node A and node B are sending simultaneously toward node C. Even though both node A and B have a congestion indicator that exceeds the threshold, they receive a fair share of the link bandwidth toward node C. Thus, the algorithm marks an end node as a potential contributor for a hot spot and forwards a repath trap if the congestion indicator value is above the threshold and the port utilization ratio is less than 50%.

In addition, if a new flow is directed to an existing hot spot, the new flow can be moved to the slow lane. On the opposite, if an end node is no longer a hot-spot, all flows that are directed to that end node can be moved back to its virtual lane classified as fast lane.

When a repath trap is received by a potential contributor, the Algorithm 2 can be executed. The host can retrieve all the active QPs and compare them with the DLID in the repath trap. If a matching DLID is found in one of the QPs, the QP is reconfigured to use a slow lane. Initially, all QPs are initialized using a fast lane.

Referring back to FIG. 3, the dFtree algorithm can avoid HOL blocking after the PM detects that node 5 is the hot-spot when the congested flows are presented. Then, a repath trap that encapsulates node 5 as a hot-spot LID is forwarded to the source node of the contributors and the victim flows. When a sender (hot-spot contributor or a victim flow) receives the repath trap, the sender retrieves all the active QPs and compares the destination LID with the repath trap LID. If a QP has a matching destination LID, the QP can be reconfigured to the slow lane. There can be a slight glitch for related flows because the QPs are reconfiguring to the slow lane. After the reconfiguration, the victim flow regains its throughput because the dFtree algorithm places the con-gested flows in a separated VL (the slow lane) that resolves the HOL blocking.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for alleviating traffic congestion in a middleware machine environment operating on one or more microprocessors, comprising:
   sweeping, via a subnet manager, a subnet in the middleware machine environment to discover changes and maintain the subnet fully connected;
   retrieving, via a performance manager, performance and error-related information from one or more performance management agents that are associated with one or more components in the subnet;
   identifying a hot-spot flow to a hot-spot in the subnet;
   dynamically reconfiguring network connections to improve network performance; and
   reassigning the hot-spot flow to a virtual lane classified as a slow lane.

2. The method according to claim 1, further comprising:
   supporting a fat-tree topology in the middleware machine environment, wherein the fat-tree topology is one of a simple fat-tree topology and an over-subscribed fat-tree topology.

3. The method according to claim 1, further comprising:
   using a routing algorithm to ensure deadlock freedom for a packet forwarded from a source node to a destination node.

4. The method according to claim 3, wherein the routing algorithm forwards the packet through a least common ancestor node of the source node and the destination node.

5. The method according to claim 4, wherein the routing algorithm includes an upward stage, in which the packet is forwarded from the source node to the least common ancestor node, and a downward stage, in which the packet is forwarded from the least common ancestor node to the destination.

6. The method according to claim 1, further comprising:
   configuring one or more physical links in the middleware machine environment to be associated with multiple virtual lanes.

7. The method according to claim 1, wherein the hot-spot and its contributors are identified using one or more performance counters as metrics during network operation.

8. The method according to claim 1, further comprising:
   forwarding a repath message to all contributors after discovering a host-spot.

9. A method for alleviating traffic congestion in a middleware machine environment operating on one or more microprocessors, comprising:

sweeping, via a subnet manager, a subnet in the middleware machine environment to discover changes and maintain the subnet fully connected;
retrieving, via a performance manager, performance and error-related information from one or more performance management agents that are associated with one or more components in the subnet;
identifying a hot-spot flow to a hot-spot in the subnet;
dynamically reconfiguring network connections to improve network performance; and
assigning the hot-spot flow that is in a simple fat-tree topology to a virtual lane classified as a slow lane if a victim flow shares an upward stage with the hot-spot flow.

10. A method for alleviating traffic congestion in a middleware machine environment operating on one or more microprocessors, comprising:
sweeping, via a subnet manager, a subnet in the middleware machine environment to discover changes and maintain the subnet fully connected;
retrieving, via a performance manager, performance and error-related information from one or more performance management agents that are associated with one or more components in the subnet;
identifying a hot-spot flow to a hot-spot in the subnet;
dynamically reconfiguring network connections to improve network performance; and
assigning the hot-spot flow that is in an over-subscribed fat-tree topology to a virtual lane classified as a slow lane if a victim flow shares at least one of an upward stage and a downward stage with the hot-spot flow.

11. The method according to claim 9, further comprising: directing all flows to an node from a slow lane to a fast lane, after determining that a node is no longer a hot-spot.

12. The method according to claim 9, further comprising: using a congestion control mechanism to prevent the victim flow from head-of-line blocking.

13. A system for preventing traffic congestion in a middleware machine environment operating on one or more microprocessors, comprising:
a subnet manager that sweeps a subnet in the middleware machine environment to discover changes and maintain the subnet fully connected;
a performance manager that retrieves performance and error-related information from one or more performance management agents that are associated with one or more components in the subnet, and identifies a hot-spot flow to a hot-spot in the subnet; and
a host side stack that dynamically reconfigures network connections in order to improve network performances;
wherein the system operates to reassign the hot-spot flow to a virtual lane classified as a slow lane.

14. The system according to claim 13, wherein the subnet in the middleware machine environment is in a fat-tree topology, or an over-subscribed fat-tree topology.

15. A non-transitory machine readable storage medium having instructions stored thereon that when executed cause a system to perform the steps comprising:
sweeping, via a subnet manager, a subnet in a middleware machine environment to discover changes and maintain the subnet fully connected;
retrieving, via a performance manager, performance and error-related information from one or more performance management agents that are associated with one or more components in the subnet;
identifying a hot-spot flow to a hot-spot in the subnet based on the performance and error-related information;
dynamically reconfiguring network connections to improve network performance; and
reassigning the hot-spot flow to a virtual lane classified as a slow lane.

16. The method according to claim 9, further comprising: supporting a fat-tree topology in the middleware machine environment, wherein the fat-tree topology is one of a simple fat-tree topology and an over-subscribed fat-tree topology.

17. The method according to claim 9, further comprising: using a routing algorithm to ensure deadlock freedom for a packet forwarded from a source node to a destination node.

18. The method according to claim 10, further comprising: supporting a fat-tree topology in the middleware machine environment, wherein the fat-tree topology is one of a simple fat-tree topology and an over-subscribed fat-tree topology.

19. The method according to claim 10, further comprising: using a routing algorithm to ensure deadlock freedom for a packet forwarded from a source node to a destination node.

20. The method according to claim 19, wherein the routing algorithm forwards the packet through a least common ancestor node of the source node and the destination node.

* * * * *

UNITED STATES PATENT AND TRADEMARK OFFICE
CERTIFICATE OF CORRECTION

| | | |
|---|---|---|
| PATENT NO. | : 8,879,396 B2 | Page 1 of 1 |
| APPLICATION NO. | : 13/648961 | |
| DATED | : November 4, 2014 | |
| INVENTOR(S) | : Guay et al. | |

It is certified that error appears in the above-identified patent and that said Letters Patent is hereby corrected as shown below:

In the Drawings

On sheet 2 of 4, in figure 2, under reference numeral 202, line 3, delete "sunet" and insert -- subnet --, therefor.

In the Specification

In column 1, line 28, delete "13/671,467," and insert -- 13/671,467 --, therefor.

In column 1, line 29, delete "2012" and insert -- 2012, --, therefor.

In column 1, line 51, delete "Forschungszcntrum" and insert -- Forschungszentrum --, therefor.

In column 5, line 45, delete "sunet." and insert -- subnet. --, therefor.

In column 7, line 28, delete "use" and insert -- used --, therefor.

In column 9, line 53, delete "con-gested" and insert -- congested --, therefor.

In the Claims

In column 10, line 64, in Claim 8, delete "host-spot." and insert -- hot-spot. --, therefor.

Signed and Sealed this
Twenty-third Day of June, 2015

Michelle K. Lee
*Director of the United States Patent and Trademark Office*